US012637243B1

(12) United States Patent
Fallas

(10) Patent No.: US 12,637,243 B1
(45) Date of Patent: May 26, 2026

(54) ROBOTIC CASE PACKING SYSTEM

(71) Applicant: Fallas Automation, Inc., Waco, TX (US)

(72) Inventor: David Fallas, Waco, TX (US)

(73) Assignee: Fallas Automation, Inc., Waco, TX (US)

( * ) Notice: Subject to any disclaimer, the term of this patent is extended or adjusted under 35 U.S.C. 154(b) by 0 days.

(21) Appl. No.: 19/342,134

(22) Filed: Sep. 26, 2025

(51) Int. Cl.
| | |
|---|---|
| *B65B 5/06* | (2006.01) |
| *B65B 5/10* | (2006.01) |
| *B65B 35/18* | (2006.01) |
| *B65B 35/20* | (2006.01) |
| *B65B 35/24* | (2006.01) |
| *B65B 35/58* | (2006.01) |
| *B65B 43/39* | (2006.01) |
| *B65B 43/50* | (2006.01) |
| *B65B 43/52* | (2006.01) |
| *B65B 57/14* | (2006.01) |
| *B65G 47/82* | (2006.01) |
| *B65G 47/91* | (2006.01) |
| *B65G 57/03* | (2006.01) |

(52) U.S. Cl.
CPC .............. *B65B 5/105* (2013.01); *B65B 35/18* (2013.01); *B65B 35/205* (2013.01); *B65B 35/24* (2013.01); *B65B 35/58* (2013.01); *B65B 43/39* (2013.01); *B65B 43/50* (2013.01); *B65B 43/52* (2013.01); *B65B 57/14* (2013.01); *B65G 47/82* (2013.01); *B65G 47/91* (2013.01); *B65G 57/03* (2013.01)

(58) Field of Classification Search
CPC ....... B65B 5/105; B65B 35/205; B65B 35/16; B65B 35/18; B65B 35/58; B65B 43/39; B65B 43/50; B65B 43/52
See application file for complete search history.

(56) References Cited

U.S. PATENT DOCUMENTS

| | | | | |
|---|---|---|---|---|
| 3,729,085 A | * | 4/1973 | Schlueter ............... | B65G 47/24 |
| | | | | 198/792 |
| 4,367,619 A | * | 1/1983 | Lorsch ................... | G03D 15/10 |
| | | | | 53/245 |
| 5,611,193 A | * | 3/1997 | Farrelly ................. | B65B 21/18 |
| | | | | 53/252 |

(Continued)

OTHER PUBLICATIONS

Screen captures from YouTube video entitled "Adabot Case Packer for Flexible Bags", 2p, uploaded on Jun. 27, 2022 by Fallas Automation, retrieved from Internet: https://www.youtube.com/watch?v=wo63UX_xZ90.

(Continued)

*Primary Examiner* — Andrew M Tecco
(74) *Attorney, Agent, or Firm* — Crowell & Moring LLP

(57) ABSTRACT

A case packing system for loading articles into a container includes an article conveyor for conveying an article, a case conveyor for conveying a container, a multi-axis robot, and a controller operatively coupled to the multi-axis robot. The multi-axis robot picks the article from the article conveyor and places the article such that it is least partially disposed between two opposing foldable flaps of the container. The relative position of the article and the container are adjusted from a first position where the article is at least partially disposed between the two opposing foldable flaps to a second position where the article is positioned fully within the container cavity.

15 Claims, 9 Drawing Sheets

(56) References Cited

U.S. PATENT DOCUMENTS

| | | | | |
|---|---|---|---|---|
| 7,644,558 | B1 * | 1/2010 | Fallas .................. | B65G 47/914 |
| | | | | 53/251 |
| 8,997,438 | B1 * | 4/2015 | Fallas ................... | B25J 9/0093 |
| | | | | 901/17 |
| 9,260,207 | B2 * | 2/2016 | Razumov ................ | B65B 5/105 |
| 10,086,510 | B1 * | 10/2018 | McAninch ............. | B65B 35/24 |
| 2013/0283731 | A1 * | 10/2013 | Komp ..................... | B65B 35/38 |
| | | | | 53/268 |
| 2014/0199150 | A1 * | 7/2014 | Razumov ............ | B65G 1/1378 |
| | | | | 414/800 |

OTHER PUBLICATIONS

Screen captures from YouTube video entitled "Adabot-LV Shelf Ready Case Packer", 4p, uploaded on May 16, 2022 by Fallas Automation, retrieved from Internet: https://www.youtube.com/watch?v=Owx1V8MgHg8&t=1s.
Screen captures from YouTube video entitled "BluePrint Automation (BPA) Case Packer Spider 200i", 3p, uploaded on Feb. 21, 2025 by BluePrint Automation—BPA, retrieved from Internet: https://www.youtube.com/watch?v=sKbz8yeNTK8.

* cited by examiner controller
(102)

ROBOTIC CASE PACKING SYSTEM

TECHNICAL FIELD

The present disclosure relates generally to a case packing system, and in particular, a robotic case packing system for loading articles from a moving conveyor into containers, such as corrugated cardboard boxes.

BACKGROUND

For many years, attempts have been made to develop improved systems for picking up individual articles from a conveyor or similar conveyor system and depositing those articles within a container, such as a corrugated cardboard box. The desire is to accomplish this task with speed and accuracy. To meet the demand for speed, past solutions have used multiple robots along the conveyor, such as described in Applicant's U.S. Pat. No. 6,540,063, which is incorporated herein by reference. Often, if four such robot heads are used, each head picks up every fourth article on the conveyor system in a staggered manner so that the four robot heads effectively remove four consecutive articles during each iteration. While this multiplicity of heads increases the packing speed, the means for moving the robot heads from the conveyor system to the container may be awkward or cumbersome to implement.

To provide greater flexibility, multi-axis robots have been developed for picking an article off of a common conveyor. Many such multi-axis robots, however, have proven to be fairly slow and heavy. Hence, while such robots may provide greater flexibility in motion, they have also provided a need for an even greater number of robots to meet the speed requirements in the marketplace today. Additionally, it has been found that with some three-axis robots, the range of movement may be limited in certain directions. For example, certain three-axis robots are very limited in their vertical component, which can make movement of an article from a conveyor into a deep container difficult to perform.

To provide even greater flexibility, multi-axis robots as disclosed in Applicant's U.S. Pat. Nos. 7,644,558, 8,997, 438, and 10,086,510, which are fully incorporated herein by reference, can be used for picking an article off of a common conveyor and placing the article in a container. The multi-axis robot can provide the desired speed of operation with the desired range of movement and can accurately pick articles from the conveying system and place them into containers.

Even with the improvements made so far in case packing, operators are continually striving for faster and more efficient systems for packing articles from a conveyor into containers. These desired efficiencies include reducing the number of robots necessary to pack a container, reducing the number and type of movements necessary to pack a container, and/or reducing the distance an article needs to travel to pack a container. Operators are also striving to implement these systems in a manner that meets "shelf-ready packaging" (SRP) or "retail-ready packaging" (RRP) requirements. SRP and RRP generally refer to the preparation of a product that is delivered to a retailer in a ready-to-shelf or shelf-ready merchandised unit. For example, SRP and RRP products can be easily placed on a shelf without the need for unpacking or repacking. In that regard, SRP and RRP products may be packaged in containers that allow the container to be shipped, stacked, and opened on a pallet or shelf in a manner that allows the product to be displayed in the opened container in an isle on the floor of a retail outlet.

For example, SRP and RRP products may be packaged in a container in an upright or vertical position, aligned in one or more rows within the container, such that the product brand or name, and/or contents, can be seen while the product remains in the container.

SUMMARY

In one aspect, a case packing system for loading an article into a container includes an article conveyor for conveying an article, a case conveyor for conveying a container, a multi-axis robot disposed above the case conveyor, and a controller operatively coupled to the multi-axis robot. The container includes a base and a plurality of sides defining a container cavity, and two opposing foldable flaps extending from two of the plurality of sides. The controller is configured to control the multi-axis robot to pick the article from the article conveyor and place the article such that at it is at least partially disposed between the two opposing foldable flaps of the container. The controller is also configured to adjust a relative position of the article and the container from a first position where the article is at least partially disposed between the two opposing foldable flaps to a second position where the article is positioned fully within the container cavity.

In another aspect, a case packing system for loading an article into a container includes an article conveyor for conveying a plurality of articles, a case conveyor for conveying a container, a multi-axis robot disposed above the case conveyor, and a controller operatively coupled to the multi-axis robot. The container includes a base and a plurality of sides defining a container cavity, and two opposing foldable flaps extending from two of the plurality of sides defining an opening to the container cavity. The controller is configured to control the multi-axis robot to pick and place the plurality of articles in a stacked, vertical arrangement aligned with the opening to the container cavity. The controller is further configured to adjust a relative position of the articles and the container such that the plurality of articles are positioned fully within the container cavity.

In another aspect, a case packing method includes conveying an article on an article conveyor, conveying a container on a case conveyor, and picking the article with a multi-axis robot from the article conveyor. The container includes a base and a plurality of sides defining a container cavity, and two opposing foldable flaps extending from two of the plurality of sides. The method further includes picking the article with a multi-axis robot from the article conveyor, placing the article such that it is at least partially disposed between the two opposing foldable flaps of the container, and adjusting a relative position of the article and the container from a first position where the article is at least partially disposed between the two opposing foldable flaps to a second position where the article is positioned fully within the container cavity.

BRIEF DESCRIPTION OF THE DRAWINGS

The embodiments of the present disclosure may be better understood with reference to the following drawings and description. The components in the figures are not necessarily to scale, with emphasis instead placed upon illustrating the principles of the present disclosure. Moreover, in the figures, like reference numerals are generally used to designate similar or identical features.

DETAILED DESCRIPTION OF THE EMBODIMENTS

Figure 1:
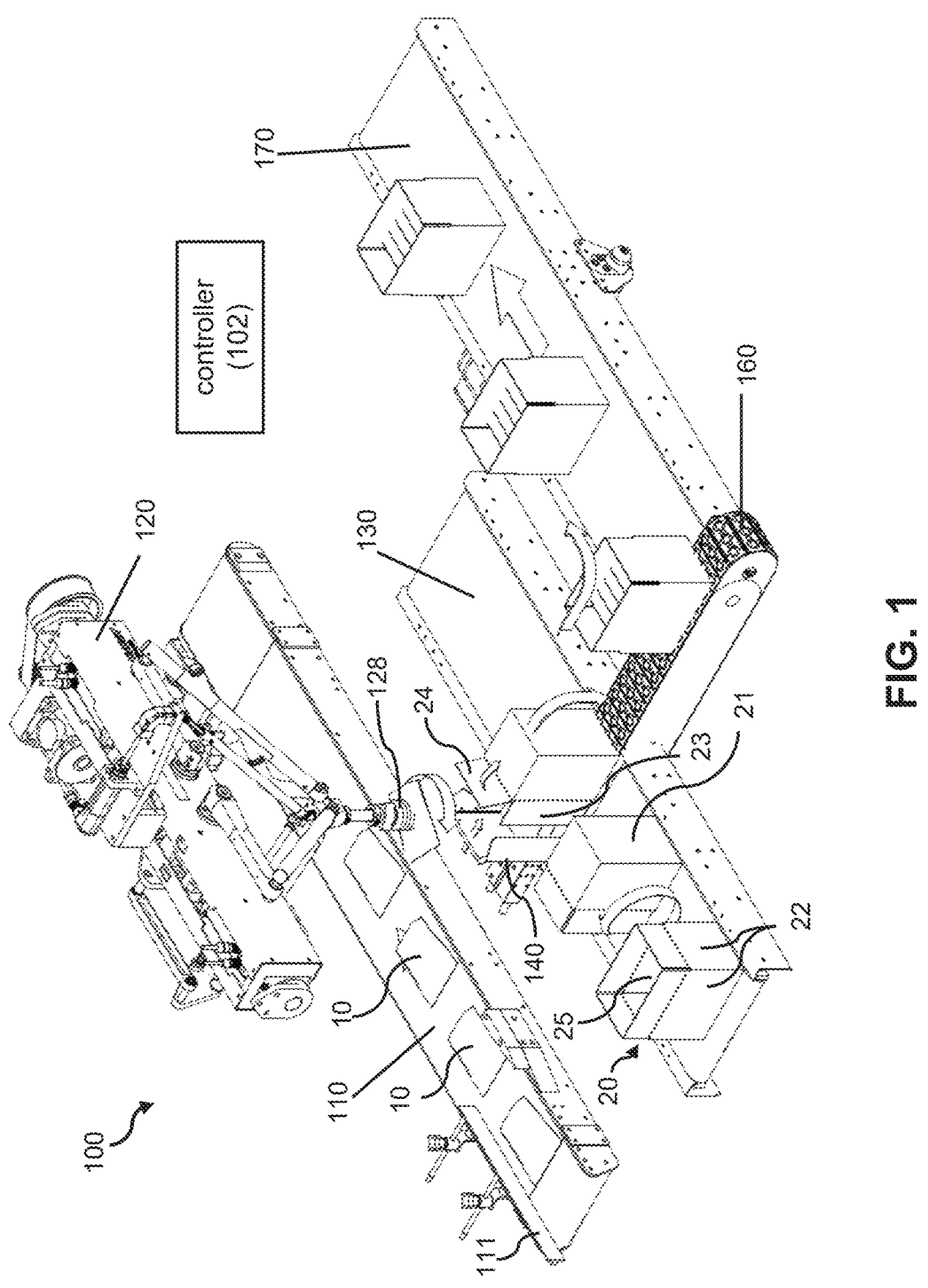
FIG. 1 is a perspective view of a robotic case packing system of the present disclosure.
Figure 2:
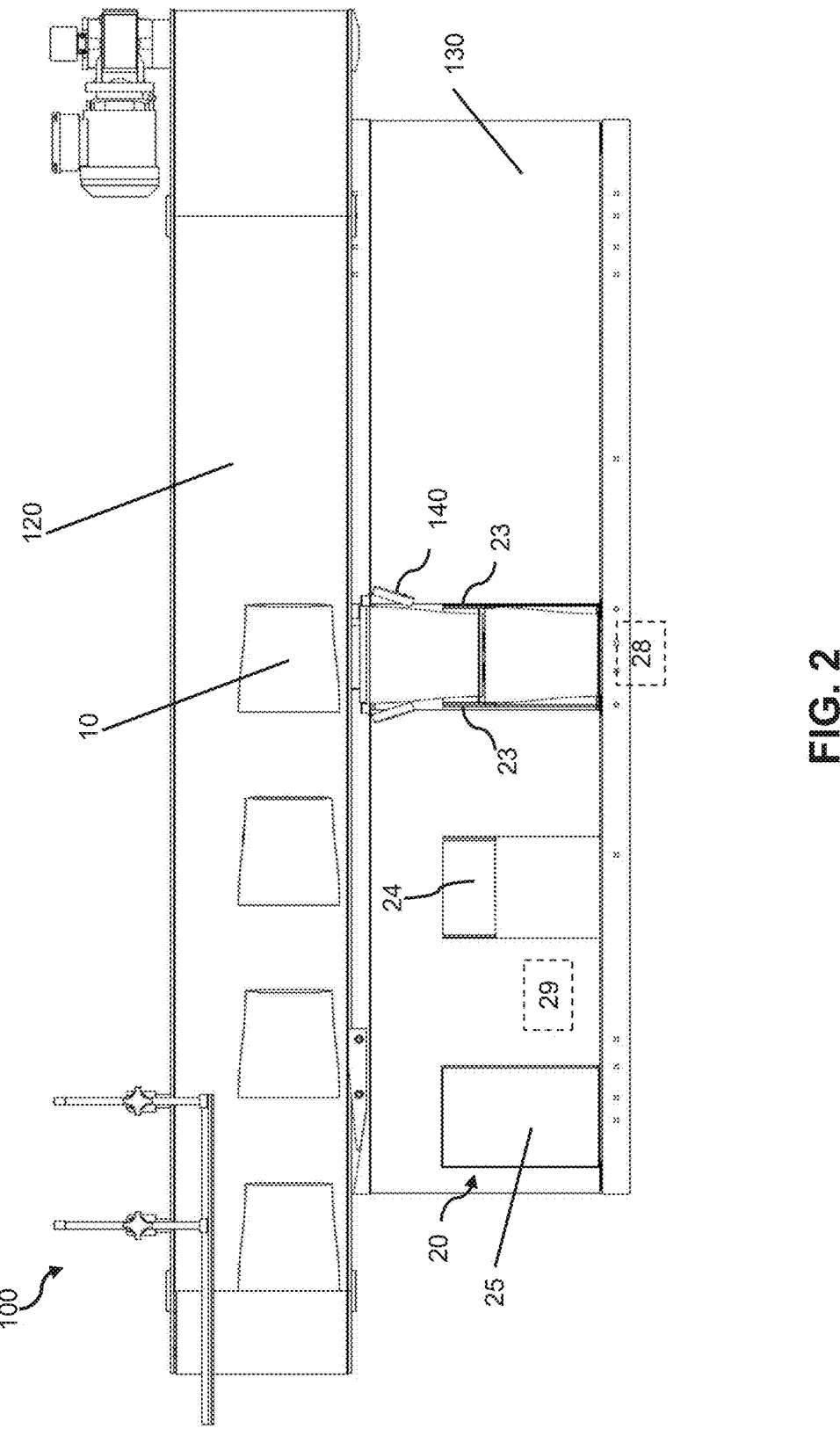
FIG. 2 is a top view of an article conveyor and case conveyor of the system of FIG. 1.
Figure 3:
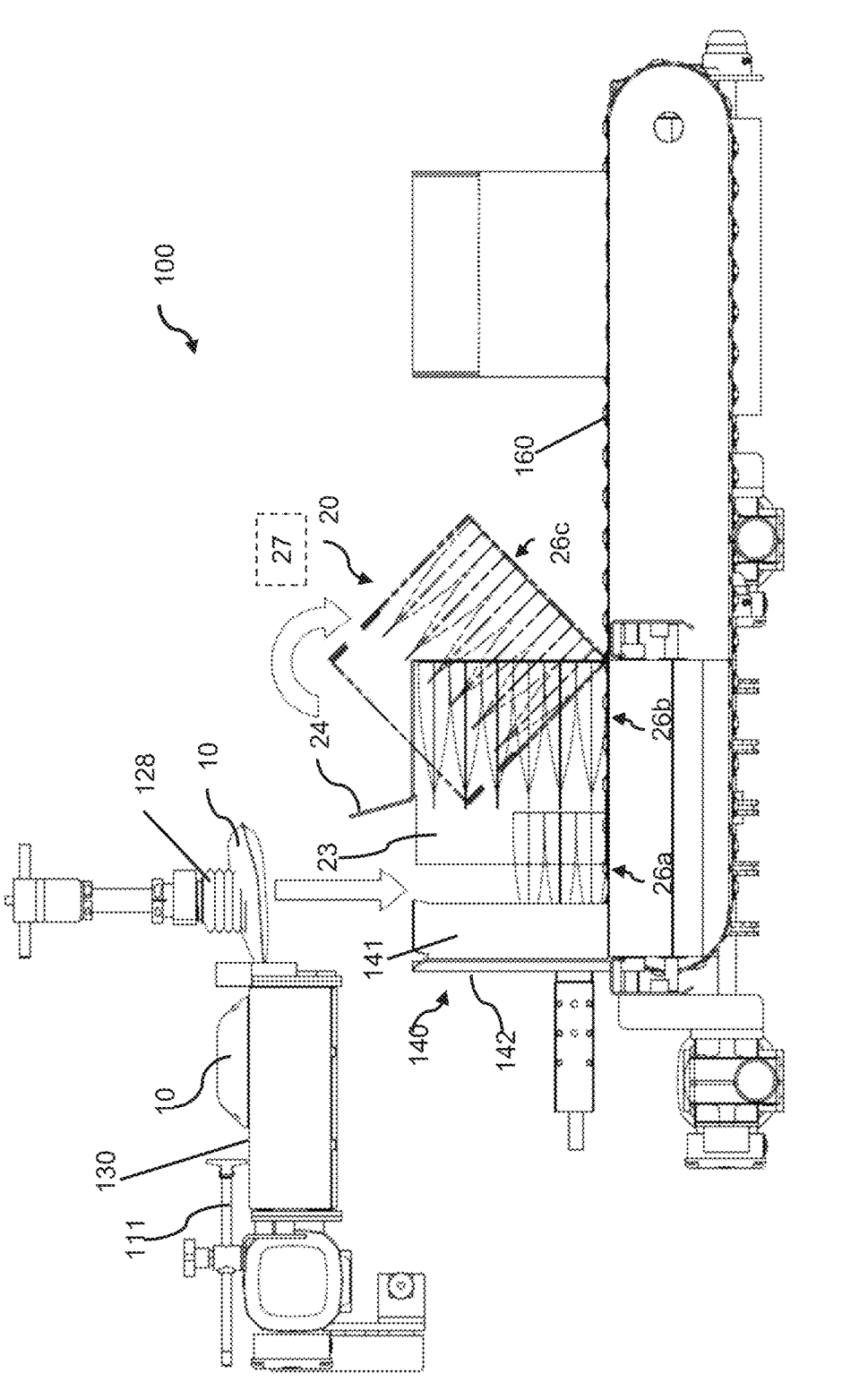
FIG. 3 is a side view of the robotic case packing system of FIG. 1.

FIGS. 1-3 depict a robotic case packing system 100 according to the present disclosure. The case packing system 100 includes an article conveyor 110, a case conveyor 130, a controller 102 (shown schematically), and at least one multi-axis robot 120 in the form of a pick and place robot. The case packing system 100 may include at least one product pusher 140. The case packing system 100 may also include at least one transfer conveyor 160, a loaded case conveyor 170, or both. The case packing system 100 uses the robot 120 to pick and place a single article 10 at a time from the article conveyor 110 with a handler 128, and stack the picked article(s) 10 immediately adjacent to, and preferably at least partially within, a container 20 oriented on its side. The case packing system 100 may then use a product pusher 140 to push the stacked articles to a position fully contained within a cavity of the container 20 oriented on its side. The case packing system 100 may then rotate (e.g., pivot or tilt) the container 20 so that the plurality of articles 10 and container 20 are in an upright orientation.

The articles 10 can be packages, bags, boxes, or any other type of item or product that can be loaded onto the article conveyor 110, including both regular and irregular shaped items. In some embodiments, the articles 10 may be flexible pouches, for example, plastic pouches, containing a plurality of individual products, such that when the pouches stand upright or in a vertical position, the plurality of individual products settle to the base of the pouches due to gravity, forming a relatively large base or footprint of each pouch, and a relatively small or narrow top. In contrast, when such pouches lie flat (for example, along case conveyor 130, or when loaded in container 20, before rotation of the container to an upright orientation), the plurality of individual products spatially distribute within the internal volume of each pouch due to gravity, such that they are generally even between the top and bottom of the pouch.

The container 20 includes a base 21 and a plurality of sides 22 defining a cavity 25. As described, the container 20 may be a corrugated cardboard case, where the base 21 is formed through the folding of two or more foldable flaps that are then secured to each other and the sides of the case. The base 21 can be considered the bottom of the container 20. The container 20 may also include two opposing foldable flaps 23 on a top portion of the case. The opposing foldable flaps 23 extend from the plurality of sides 22. The opposing foldable flaps 23 define an opening for loading product into the cavity 25 of the container 20. After loading the container 20 with articles 10 (and rotating the container 20 as described herein), the opposing foldable flaps 23 may be folded down to form a lid or top of the container 20. The foldable flaps 23 may be foldable about a fold line generally indicated by dashed lines on some of the containers depicted in FIGS. 1-3. In some examples, the container 20 includes additional foldable flaps 24 (e.g., a bottom and top foldable flap 24) that are perpendicular to the opposing foldable flaps 23, which also may be foldable about a fold line generally indicated by dashed lines in FIGS. 1-3. Like the opposing foldable flaps 23, the additional foldable flaps 24 may be folded down along with the opposing foldable flaps 23 to form a lid or top of the container 20. The container 20 may, in some examples, include a separate top such that neither the opposing foldable flaps 23 nor the additional foldable flaps 24 are necessary. The cavity 25 of container 20 is designed to contain the articles 10 during shipment, and allow the product to be displayed on a shelf after being opened in SRP and RRP scenarios.

Figure 4:
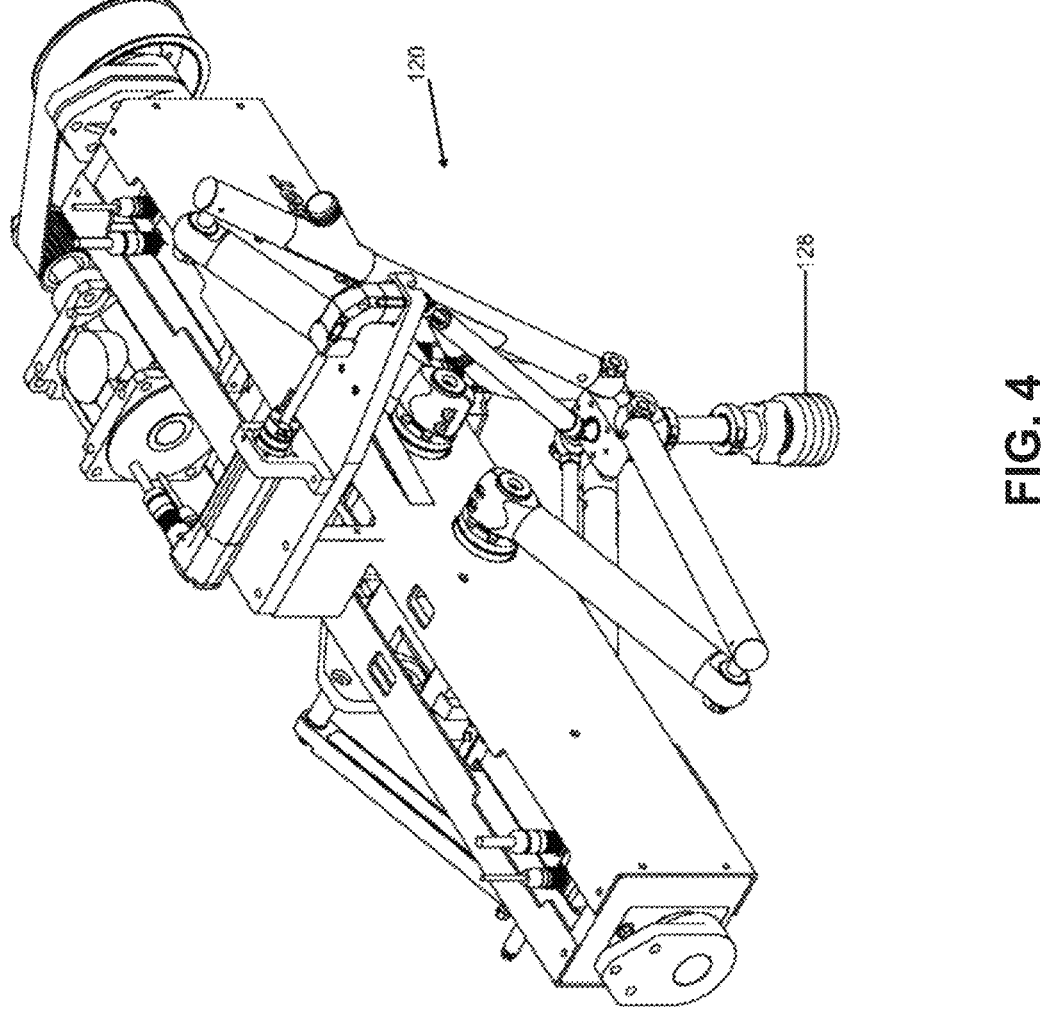
FIG. 4 is a perspective view of an embodiment of a multi-axis robot of the system of FIG. 1.

As illustrated in FIG. 1, the robot 120 is a multi-axis pick and place robotic device. For example, the robot 120 may be a multi-axis robotic device having a two-axis robot and a pivot to move the handler 128 in three axes (X, Y, Z) similar to some robots disclosed in Applicant's incorporated U.S. Pat. Nos. 7,644,558, 8,997,438, and 10,086,510. A suitable type of a six-axis robotic device is the Fallas Automation R700 Adabot, shown in FIG. 4, or any comparable pick and place six-axis robot. A suitable type of a three-axis robotic device is the ABB Flexpicker system or any comparable delta robot, such as described in U.S. Pat. No. 4,976,582, the entirety of which is herein incorporated by reference. In any event, any suitable type of multi-axis robot can be used and can be actuated by pneumatics, electricity, hydraulics, or the like.

One or more support frames (not shown) supports the robot 120 relative to the conveyors 110, 130 so the robot 120 can move the handler 128 along a desired path of operation to selectively pick the articles 10 from the article conveyor 110 and place the articles 10 at least partially disposed between the two opposing foldable flaps 23. The support frame(s) (not shown) can have any of a variety of shapes and configurations suitable for providing requisite stability and support for the robot 120. That is, the support frame(s) may be a stand-alone frame that is operatively associated with the conveyors 110, 130 to properly align the robot 120 with the conveyors 110, 130. Alternatively, the support frame(s) may be part of a framework attached to a building in which the case packing system 100 is housed and utilized.

The handler 128 on the robot 120 can use a suction cup, a mechanical gripper, or other device to pick up and release the articles 10. For example, the handler 128 can be a vacuum pick assembly for selectively vacuuming and holding an article or articles 10 from the conveyor 110 and subsequently releasing the articles 10 when and where desired. It will be appreciated by those of skill in the art that other devices for handling the articles 10 may be used. For example, the robot 120 may use a mechanical gripper as the handler 128. The gripper may comprise a three-finger or four-finger gripper, or other device to grab the articles 10 from the conveyor 110 and subsequently release the articles 10 when and where desired.

The article conveyor 110, during operation, delivers the articles 10 in a spaced manner, which may be regular or random. Preferably, the delivery is at a known, constant speed, but this is not strictly necessary. The articles 10 may be loaded on to the article conveyor 110 in a generally uniform and consistent manner. For example, the articles 10 may be loaded on to the article conveyor 110 so that they are generally equally spaced and their centerline (along the direction of travel) is generally uniform. The articles 10 also may be loaded on to the article conveyor 110 in the same orientation. By way of example, as described previously, the articles 10 may be stand-up pouches (e.g., gusseted pouches) for display in SRP and RRP, and in such configurations, the articles 10 may be loaded onto the article conveyor 110 such that the bottom or gusseted portion of the article 10 is facing the same direction, such as the leading edge in the direction of travel. This reduces the amount of movement the robot 120 must perform to ensure the stacking of articles 10 in the same orientation, increasing efficiency.

The article conveyor 110 may include one or more aligners 111. The aligner 111 can move the articles 10 so that they are disposed in a generally straight line along a direction of travel of the article conveyor 110. This in turn ensures that the articles 10 are all generally in the same position upon reaching the robot 120, increasing the movement efficiency of the robot 120. The aligner 111 may be affixed to the side of the article conveyor 110 and extend over a portion of the article conveyor 110. The aligner 111 may be a rail, wall, bar, or other suitable structure capable of providing a force to the articles 10. As the articles 10 proceed down the article conveyor 110, the articles 10 may abut against the aligner 111 and be pushed in a lateral direction. The aligner 111 may alternatively be attached to a servo motor or other actuator that selectively extends outward align any articles 10 that are not generally in line with the others. Alternatively or additionally, the article conveyor 110 includes one or more sensors (e.g., photo cell) to detect passage of the article(s) 10 to control the movements of the robot 120. The sensor can use any suitable imaging systems and can determine the placement of articles 10 across the width of the article conveyor 110 so the articles 10 do not need to be individually conveyed in a line.

The system 100 can use any of a number of readily available and suitable conveyor systems that deliver the articles 10 and containers 20 at a desired rate for handling. For example, the article conveyor 110 is positioned below and slightly to one side of the robot 120 and can have a conveyor belt driven by a motor. Similarly, the case conveyor 130 is positioned below and slightly to one side of the robot 120 and can have a conveyor belt driven by a motor. As an alternative to the belt and motor systems, either one or the both of the conveyors 110, 130 can have systems using actuatable rollers or other suitable types of conveyance mechanism.

As shown, the case conveyor 130 is positioned parallel to the article conveyor 110. The case conveyor 130 is further positioned to be a pre-selected distance from the article conveyor 110. In some examples, and as shown, the case conveyor 130 is positioned to be below the article conveyor 110. In other examples, the case conveyor 130 may be positioned at the same level or above the article conveyor 110. The case conveyor 130 may be off to one side of the article conveyor 110, as depicted in FIGS. 1-3, or may be directly below the article conveyor 110.

The case conveyor 130 moves the containers 20 to receive the articles 10 from the robot 120. The case conveyor 130 may position the containers 20 to receive the articles 10 in a side orientation. The case conveyor 130 may be configured to periodically start and stop as the containers 20 are moved for loading by the robot 120. Alternatively, the case conveyor may be configured to remain in motion while the containers 20 are loaded by the robot 120. The case conveyor 130 may also include a case erector (not shown) positioned upstream of the product pusher 140 for constructing corrugated cardboard cases or similar containers and moving them to the desired position for receipt of articles.

As depicted in FIGS. 1-3, the case conveyor 130 moves the containers 20 (e.g., corrugated cardboard cases or similar containers) in a conveyance direction parallel to the conveyance direction of the article conveyor 110. While parallel, the conveyance directions and may be in the same direction or in opposite directions. Alternatively, the conveyance directions may be perpendicular to one another. The case conveyor 130 may have an inside rail and a biased rail that pushes the containers 20 against the inside rail in order to align the containers 20.

As system 100 picks and places the articles 10 for loading into the container 20, the container 20 is in a side orientation. In the side orientation, the opening to the container 20 faces towards the product pusher 140. The container 20 may initially enter the case conveyor 130 in an upright orientation, such that the opening to the container 20 faces upward, perpendicular to the product pusher 140. The system 100 may include a container rotator 29 (shown schematically) operatively coupled to the controller 102 to rotate the container 20 from the upright orientation to the side orientation for loading by the robot 120 and product pusher 140. The container rotator may include an actuator, ledge, and/or ramp configured to rotate the container from the upright orientation to the side orientation. In some examples, the container 20 enters the case conveyor 130 in a side orientation.

The system 100 includes a controller 102 (shown schematically), operatively coupled to the robot 120, article conveyor 110, and case conveyor 130. The controller 102 selectively actuates the robot 120 to move the handler 128 to the article conveyor 110 and pick up an article 10. Specific features of the controller 102 and how it communicates with the various motors, actuators, sensors, and the like in the system 100 are omitted, as they will be generally understood by one skilled in the art. In general, however, the controller 102 includes one or more processing units and memory and uses software to operate the various functions of the system 100. The controller 102 may comprise a plurality of individual controllers. The controller 102 can use a combination of any number of commercially available software packages and sensing mechanisms available in the marketplace for use with a multi-axis robot and conveyor systems. For example, available automation software and controls can be used in conjunction with the robotics to actuate and control the motion of the robot 120 in response to input from stimuli, such as from a photo cell or other sensor.

The product pusher 140 is used to adjust a relative position of the placed articles 10 to be positioned fully within the container 20. The product pusher 140 may include walls that form a general U-shape with two opposing vertical stabilizer walls 141 joined by, and adjacent to, a rear wall 142. As the robot 120 places the articles 10 in a vertical stack arrangement, the opposing stabilizer walls 141 and rear wall 142 (also referred to as a pushing wall) may prevent the articles 10 from sliding off of, or out from under, neighboring articles. The walls 141 and 142 constrain the movement of the articles 10 so that the robot 120 can form a complete stack of articles 10 before the product pusher 140 pushes the articles 10 into the cavity 25 of the container 20. The walls 141 and 142 may be dimensioned and/or may be adjustable to ensure that it fits within the cavity 25 of the container 20. In other words, the rear wall 142 and stabilizer walls 141 may be dimensioned and/or adjusted so that a maximum vertical dimension of the rear wall 142 is less than a vertical dimension of cavity (as determined when the container 20 is on its side, with the opening of the container facing the product pusher 140), and a maximum horizontal dimension of the two opposing stabilizer walls 141 is less than a horizontal dimension of the cavity (when the container 20 is on its side).

While described as a general U-shape formed of walls, the product pusher 140 may take a variety of forms. For example, the product pusher 140 may comprise rails or bars that function to constrain the movement of articles 10 such that they form a vertical stack. The rails or bars may be oriented in a vertical direction, a horizontal direction, or both, forming a lattice structure. In some examples, the product pusher 140 may include a third vertical stabilizer wall (or more) between the two opposing vertical stabilizer walls 141. This may enable system 100 (through picking and placing by the robot 120) to create multiple side-by-side vertical stacks of articles 10 for placement into the container 20.

The product pusher 140 may be connected to an actuator that drives its movement. For example, the product pusher 140 may be connected to a pneumatic cylinder that extends the product pusher 140 from a loading position to a loaded position. The actuator may also be electric, hydraulic, or mechanical. For example, the actuator may be a linear motor, a belt drive, or other suitable device.

As depicted in FIGS. 1-3, in operation, the article conveyor 110 of system 100 delivers a plurality of articles 10 to the robot 120. In parallel, the case conveyor 130 of system 100 transports a container 20 for receiving or loading of the articles 10. As described, the case conveyor 130 may initially transport the container 20 in an upright orientation, such that the opening of the container 20 faces upward. After reorienting the container 20 to its side, the case conveyor 130 may then move the container 20 so that it near the robot 120 and in place for receiving the articles. The container 20 may be positioned so that it is below the robot 120.

When moving the container 20 into the receiving position near the robot 120, the product pusher 140 may be in a retracted position (also referred to as the loading position). In the loading position, the two opposing side vertical stabilizer walls 141 of the product pusher 140 may be generally parallel to, and equally offset from the two opposing foldable flaps 23 of the container 20. In other words, the product pusher 140 may be aligned such that if it were in its fully extended position (also referred to as its loaded position) the product pusher 140 would generally be centered horizontally within the cavity 25 of the container 20. In some examples, the opposing side stabilizer walls 141 have an unequal offset from the two opposing foldable flaps 23 of the container 20. The opposing side stabilizer walls 141 may be positioned between the two opposing foldable flaps 23, such that there is no offset between the walls and the flaps.

In examples where the container has four foldable flaps, including a top foldable flap 24, a flap positioner 27 (shown schematically) may be used to retract the top foldable flap 24. FIGS. 1 and 3 depict the top foldable flap 24 in a generally retracted position. The flap positioner may include a vacuum grabber head for vacuuming the top foldable flap 24, such that it can be bent or folded outward from the container cavity. Bending the top foldable flap 24 outward provides clearance for the robot 120 to move vertically within the space between the two opposing foldable flaps 23. The flap positioner may alternatively include a mechanical gripper, such as a two, three, or four finger gripper for bending the top foldable flap 24 outward. The flap positioner may be a bar, rod, hook, or other mechanical structure, either fixed or that moves between two or more positions to bend the top foldable flap 24.

After the robot 120 picks up an article 10 from the article conveyor 110, the robot 120 moves, rotates, and places the article 10 such that it is at least partially disposed between the two opposing foldable flaps 23 of the container 20, designated 26a shown in the side view of FIG. 3. In some examples, the article 10 is placed on top of a bottom foldable flap 24. In addition to the article 10 being at least partially disposed between the two opposing foldable flaps 23, the article 10 may also be at least partially disposed between the two opposing side stabilizer walls 141. The stabilizer walls 141 and opposing foldable flaps 23 provide lateral support to the article 10. The lateral support permits the stacking of a plurality of articles 10, while maintaining orientation and ensuring the ability to fit within the cavity 25 of the container 20 without performing additional compression or orientation steps.

After a first article 10 is placed, the robot 120 moves from the case conveyor 130 back to the article conveyor 110 in order to pick up a second article 10. Upon picking up the second article 10 from the article conveyor 110, the robot 120 again moves towards the case conveyor 130. The robot 120 then places the second article 10 on top of the first article 10. Like the first article, the second article is also placed such that it is at least partially disposed between the two opposing foldable flaps 23 of the container 20. The robot 120 may pick and place multiple articles 10, stacking them in a vertical arrangement, as designated by 26a in FIG. 3. The robot 120 may stack a sufficient number of articles 10 between the two opposing foldable flaps 23 before loading them into the cavity 25 of the container 20.

Upon completing a stack of articles 10, the controller 102 of system 100 may extend the product pusher 140 from the loading position to a loaded position. As the product pusher 140 extends from the loading position to the loaded position, it moves the stack of articles 10 from being positioned at least partially disposed between the two opposing foldable flaps 23 to being positioned fully within the cavity 25 of the container 20, as designated by 26b in FIG. 3. In the loaded position, the stack of articles 10 are no longer disposed between the two opposing foldable flaps 23. Moving the stack of articles 10 into the cavity 25 fills the container 20.

By placing and stacking the articles 10 in a vertical manner, and pushing the product into the container 20 in its side orientation, the system 100 can increase packing efficiencies of the container 20. As described previously, the articles 10 may be stand-up pouches and include gussets that are designed to have a greater volume of product at the bottom of the packaging than the top. If the containers were loaded into a container in an upright orientation, a large percentage of the weight would be in the bottom of packaging, increasing the width of each article, thereby limiting the number of articles that could fit within a container. The system 100 increases packaging efficiencies by stacking the articles on the side, reducing variations in thickness from the top of the package to the bottom. As depicted in FIG. 3, stacking the articles 10 while they are on their side allows for the product contained within to be more evenly distributed. This in turn allows for a more even distribution of width or thickness of the articles when turned to an upright position. This ensures the desired amount of product is able to be loaded into the container 20. This may also increase the packing efficiency within the container by allowing more articles 10 to be packed within a single container 20.

Placing the articles 10 from the article conveyor 110 directly to a position partially within the container 20 in its side orientation can also provide operational efficiencies. Because the container 20 is on its side, the robot 120 can stack the articles 10 for loading into the container 20 without the need for an additional axis of rotation to reorient the articles 10 into an upright orientation. The types and amount of movement of the robot 120 can thereby be reduced, increasing the speed of packing the articles 10 into the container 20. In addition, using the robot 120 to load the container 20 directly can reduce the complexity of the system 100 by removing the need for additional robots and operational steps, reducing costs, potential system downtime, and reducing the footprint of the system.

Upon moving the stack of articles 10 into the cavity 25 of the container 20, the product pusher 140 retracts from the loaded position to the loading position. The container 20 may then be pivoted or rotated, as designated by 26c in FIG. 3, so that the container 20, and all of the articles 10, are in the upright orientation. Upon rotating the container 20 to the upright orientation, the product contained within the articles 10 may settle to the base of the articles 10, and likewise, the container 20, as constrained by neighboring articles 10.

As described, the container 20, after being filled with product, may be rotated from its side orientation to an upright orientation. While the system 100 may perform this pivoting or tilting of the filled container 20 on the transfer conveyor 160, the system 100 may also perform this pivoting or tilting on the case conveyor 130. As depicted in FIGS. 1-3, the case packing system 100 may load the container 20 such that when it is in the upright orientation, the articles 10 are standing vertical within the container 20. In some examples, the case packing system 100 may instead load the container 20 such that when it is in the upright orientation, the articles 10 are laying flat within the container 20.

To assist in rotating the filled container 20 from a side orientation to an upright orientation, a case stop 28 (shown schematically) may be used. The case stop may be a plate, bar, wall, ridge, finger, or other suitable structure to provide a force against the filled container 20 and provide a pivot axis for the box to rotate around. The system 100 may then use an actuator or other structure to apply a rotating force to the filled container 20 to pivot about the case stop, rotating or tilting the filled container from a side orientation to an upright orientation. By way of example, the case stop 28 may be an elongate plate extending the width of the filled container 20, and a small height of the base of the container. When a force is applied to the filled container 20, the filled container 20 will begin to pivot about the elongate plate case stop until the weight of the filled container drives the container 20 to complete the 90 degree rotation to finish in an upright orientation. The case stop 28 may be disposed along the case conveyor 130 or the transfer conveyor 160. Alternatively, the case stop 28 may be located at a height above the case conveyor 130 or the transfer conveyor 160.

The case stop 28 may be static, or the case stop may be movable such that it moves from a retracted position to an extended position. For example, the case stop may be in a retracted position below surface of the transfer conveyor 160, and in an extended position above the surface of the transfer conveyor 160. The controller 102 may be operatively connected to an actuator to extend and retract the case stop. The controller may be configured to extend the actuator and case stop only at certain portions of the loading process. For example, the controller may extend the case stop to its extended position when extending the product pusher 140 to move the stacked articles 10 into the container 20. The case stop can thereby apply a holding force to the container 20 to prevent it from sliding in the same direction as the product pusher 140 when the product pusher 140 is being extended, ensuring the container 20 is filled with the stacked articles 10. The controller may leave the case stop in its extended position while the rotating force (e.g., torque) is applied to the filled container 20 to rotate it from its side orientation to its upright orientation. When the controller determines (e.g., based on input from a sensor) that the filled container 20 has been successfully rotated to its upright orientation, the controller may retract the case stop to its retracted position. This ensures that transfer conveyor 160 is generally level for movement of the filled container 20. If the case stop is not withdrawn below the surface of the transfer conveyor 160 (e.g., if the case stop is static), then the filled container 20 may have one end raised while moving along the transfer conveyor 160 until the container 20 fully passes over the case stop, or may otherwise get caught on the case stop.

The rotating force to rotate the filled container 20 to an upright orientation may be accomplished in a variety of manners. The rotating force may be applied by the product pusher 140. For example, the product pusher 140 may be movable to a tipping position that is in a direction perpendicular to the direction of travel between the loading position and the loaded position (e.g., vertical). By way of example, then the product pusher 140 is within the cavity of the container (e.g., in the loaded position), it may move vertically, applying an upward force on the container 20, starting the rotation of the container 20 around its base at or near the case stop. As the container 20 begins to rotate, eventually the weight of the articles 10 will drive the container 20 to rotate to its upright orientation. As another example, the product pusher may be hinged, such that the top portion of the product pusher is extendable further than the bottom. By extending the top further than the bottom, a rotating force is applied to the container 20 to rotate it to its upright orientation. As another example, the rotating force may be applied via the transfer conveyor 160 in combination with a case stop 28, whether fixed or movable. By way of example, the transfer conveyor 160 may move in a direction toward the product pusher 140, and an opposing force is applied thereto such that the generated torque will operate to rotate the container to an upright position.

The rotating force may also be applied by the flap positioner. Rather than pushing on the container 20 like the product pusher 140, the flap positioner may pull on, for example, the top foldable flap 24, of the container 20 to rotate the container 20 to an upright orientation. Alternatively or additionally, the rotating force may be applied by an independent actuator. For example, a grabber could grasp the container and apply the rotating force.

The filled container 20 may be rotated to an upright orientation on a transfer conveyor 160 and then transferred to a loaded case conveyor 170. The transfer conveyor 160 and the loaded case conveyor 170 may be operatively coupled to the controller 102. As depicted in FIGS. 1 and 3, the direction of travel of the transfer conveyor 160 may be perpendicular to the direction of travel of the case conveyor 130, though it is not necessary. The direction of the travel of the loaded case conveyor 170, as depicted in FIGS. 1 and 3, may be perpendicular to the direction of travel of the loaded case conveyor 170, though it is not necessary. As the filled container 20 travels along the loaded case conveyor 170, the container may be closed, sealed, and prepared for shipment.

While the system 100 depicted in FIG. 1 includes the product pusher 140 connected to an actuator, the product pusher 140 may be static. The articles 10 may be stacked vertically, as previously described, for example, between the two opposing foldable flaps 23. Upon completion of the stack, the system 100 may push the container 20 into the stacked articles 10. The static product pusher 140 may provide a holding force to the stacked articles 10. Upon pushing the container 20, the stacked articles 10 may be fully contained within the cavity 25 of the container 20. The system 100 may then rotate the container 20 and the stacked articles 10 upright. The filled container 20 may then proceed to complete the rest of the packing process, such as folding the foldable flaps to form the top of the container 20 and sealing the container 20 for shipment.

In such embodiments, the system 100 may include structure (similar to the product pusher 140 in the loading position) to constrain the movement of articles 10 and permit vertical stacking. For example, the system may include a product stacking support affixed to the case conveyor 130. The product stacking support may include two opposing vertical walls joined by a rear wall. The walls of the product stacking support may take a variety of forms, such as those described with reference to the product pusher 140. The robot 120 may stack the articles 10 vertically between the two opposing vertical walls of the product stacking support. The two opposing vertical walls may act as stabilizers to ensure that the articles 10 are stacked without an article sliding off or out from the stack. A third stabilizer wall may also extend between the two opposing vertical walls, forming two U-shapes to allow the creation of two vertical stacks of articles 10. Alternatively, the container 20 may be loaded without a product pusher 140.

As described, upon completion of the stack of the articles 10, the controller 102 may control, for example, an actuator to apply a force on the base 21 or sides 22 of the container 20. The force may then slide the container 20 towards the stack of articles 10, filling the cavity 25 of the container 20. The container 20 may then be pivoted or rotated, so that the container 20, and all of the articles 10, are in the upright orientation. Upon rotating the container 20 to the upright orientation, the product contained within the articles 10 may settle to the base of the container.

In the embodiment of FIG. 1, one robot 120 is shown. In some embodiments for handling greater article quantities at greater speed, two or more robots 120 may be positioned and aligned along the article conveyor 110 to increase the quantity of articles 10 that may be handled off the article conveyor 110. In this alternative (not shown), if two robots 120 are utilized, then the first robot may, for example, pick up the first, third, fifth, etc. article 10 from the article conveyor 110 and the second robot may pick up the second, fourth, sixth, etc. article 10 from the article conveyor 110. The number of articles 10 that each mechanism picks up before passing on an article 10 will depend on the article rate, and has substantial flexibility. When using two or more robots 120, two or more product pushers 140 may also be used with two or more containers 20, positioned along the case conveyor 130. In this configuration, each robot may be associated with one particular product pusher to load one particular container. By way of example, the first robot 120 may pick up the first, third, and fifth articles, stacking them vertically near the first product pusher and at least partially disposed between the two opposing walls of the first container 20, while the second robot 120 picks up the second, fourth, and sixth articles, stacking them vertically near the second product pusher and at least partially disposed between the two opposing walls of the second container 20. In this configuration, the first robot 120 loads the first container along the case conveyor 130 and the second robot

120 loads the second container positioned further downstream along the case conveyor 130.

In some embodiments (especially if the articles 10 are randomly spaced) the first robot 120 in the line may pick up as many articles 10 in a row as it is able to pick before letting additional articles 10 pass to the second robot 120. The use of two or more robots 120 aligned along the article conveyor 110 thereby enables the handling of additional articles 10 in the same amount of time. Additionally, the number of articles 10 that may be loaded into each container 20 is not affected by the number of robots 120 as sometimes was the case with prior devices. It will be appreciated by those of skill in the art in light of the present disclosure that yet additional robots 120 may be aligned along the conveyor in accordance with the present disclosure in order to increase the speed of handling. Through the use of additional robots 120, the only limitation on the number of articles that may be handled is the speed of the article conveyor 110.

Figure 5:
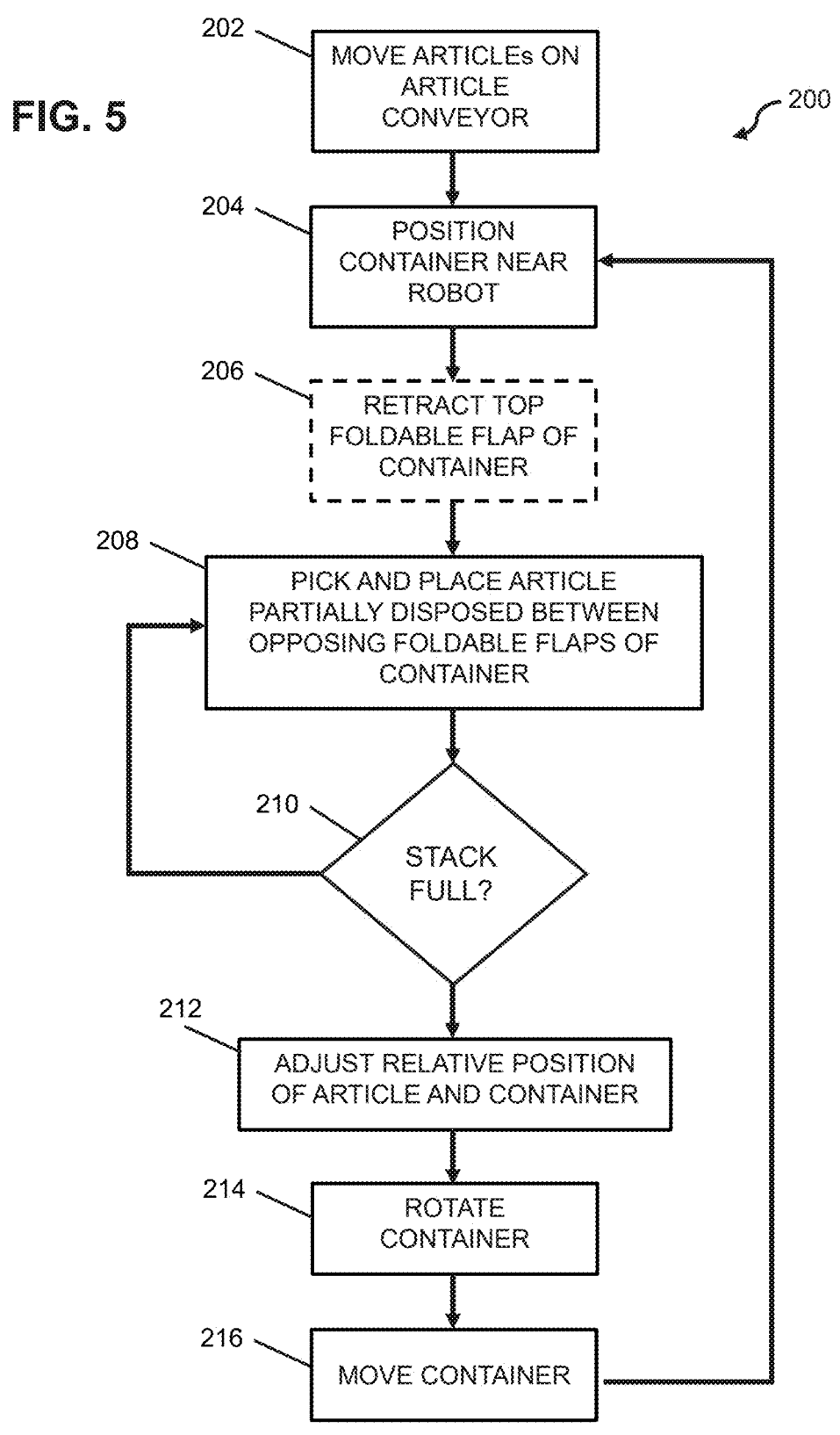
FIG. 5 is a flow chart showing operation of the disclosed system.

With an understanding of the case packing system 100, discussion now turns to a packing process 200 shown in FIG. 5. The controller 102 operates the article conveyor 110 to move the articles 10 towards the robot 120 (Block 202). To coordinate the timing of the robot 120 and the feed of the articles 10 on the article conveyor 110, the controller 102 controls the speed of the article conveyor 110 and the speed of the robot 120. A sensor may also be used to sense the movement and location of the articles 10, such as a photo cell or other imaging system.

Additionally, the controller 102 operates the case conveyor 130 to move the containers 20 toward the receiving position near the robot 120 (e.g., below the robot 120) (Block 204). Delivery of the containers 20 may be controlled by operating the case conveyor 130 and one or more stops. An encoder on the conveyor belt and/or a sensor may also be used as part of this process to position the containers 20. The containers 20 are positioned near the robot 120 (e.g., across from the product pusher 140) in a side orientation, such that the opening of the container cavity faces toward the product pusher 140.

As an optional step, after the container 20 has been placed in the loading position, a flap positioner may be used to retract the top foldable flap 24, providing clearance for the robot 120 (Optional Block 206).

As the controller 102 controls the movement of the articles 10 on the article conveyor 110, the controller operates the robot 120 to pick up an article 10. The controller 102 then moves the robot 120 to place the article 10 such that it is at least partially disposed between the opposing foldable flaps 23 of the container 20 (Block 208). As the controller 102 continues to move the articles 10 along the article conveyor 110, the robot 120 continues to pick and place the articles 10 in a vertical stack partially disposed between the opposing foldable flaps 23 until the stack is full (Decision 210).

After the stack is full, the controller 102 adjust a relative position of the article and the container from a first position where the article is at least partially disposed between the two opposing foldable flaps to a second position where the article is positioned fully within the container cavity (Block 212). Optionally, the controller 102 may extend a product pusher from a loading position to a loaded position to adjust the relative position of the article and the container from the first position to the second position. Optionally, the controller 102 may extend a case stop to apply a holding force and assist in the loading of the stack of articles 10 to a position fully within the container 20.

Once the stack of articles 10 are within the cavity 25 of the container 20, the controller 102 operates the product pusher 140 or other actuator to rotate the container 20 from the side orientation to the upright orientation (Block 214). Optionally, the controller 102 may operate the case stop to provide a pivot axis for the container 20 and assist in the rotating of the filled container 20.

Upon the container being filled and rotated to its upright orientation, the controller 102 operates the conveyor (e.g., case conveyor 130, transfer conveyor 160, and/or loaded case conveyor 170) to move the container to be closed and sealed, for example (Block 216). The controller 102 then positions a new container 20 near the robot 120 (Block 204), and the process 200 continues as before.

Figure 6:
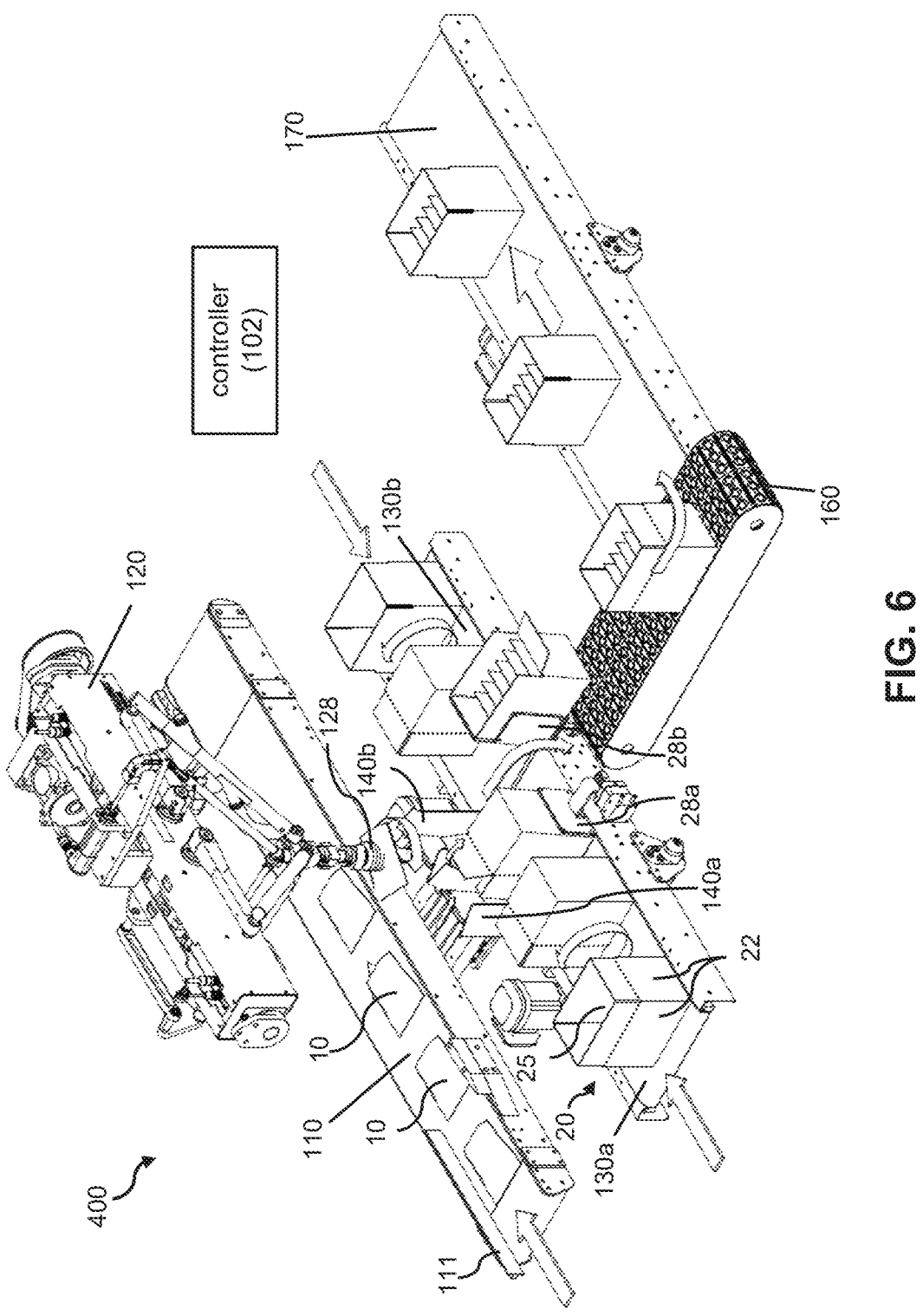
FIG. 6 is a perspective view of a second robotic case packing system of the present disclosure.
Figure 7:
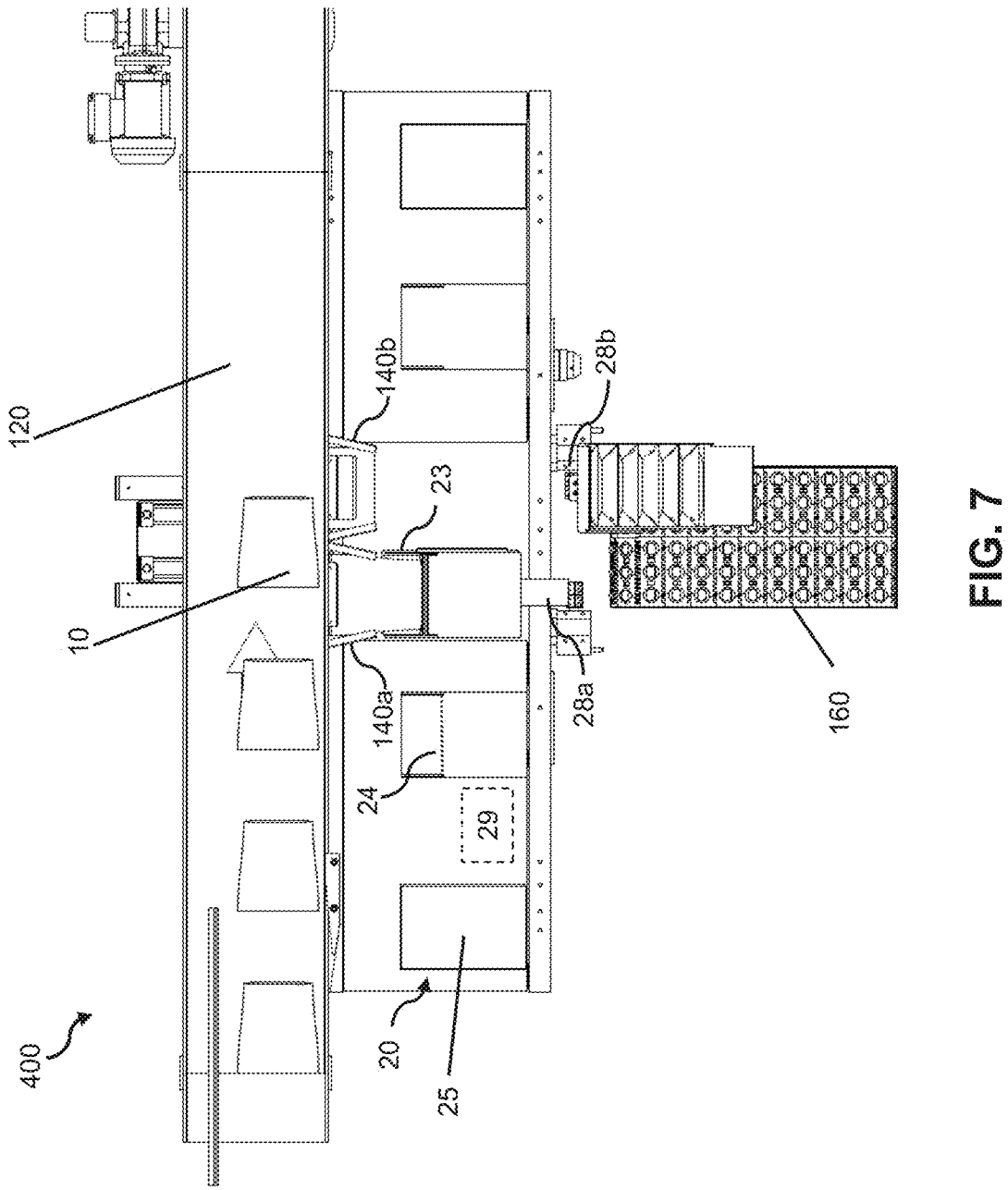
FIG. 7 is a top view of an article conveyor and case conveyor of the system of FIG. 6.
Figure 8:
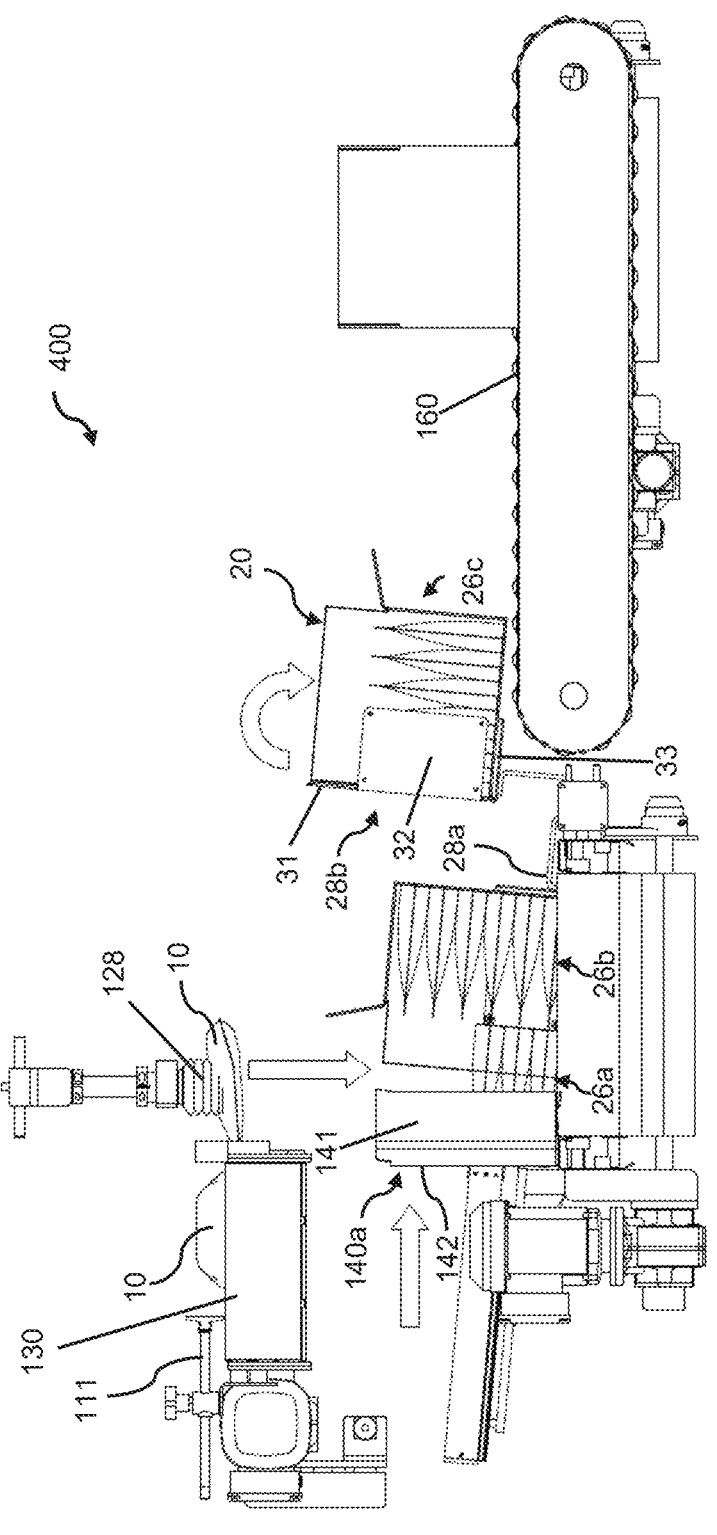
FIG. 8 is a side view of the robot case packing system of FIG. 6.
Figure 9:
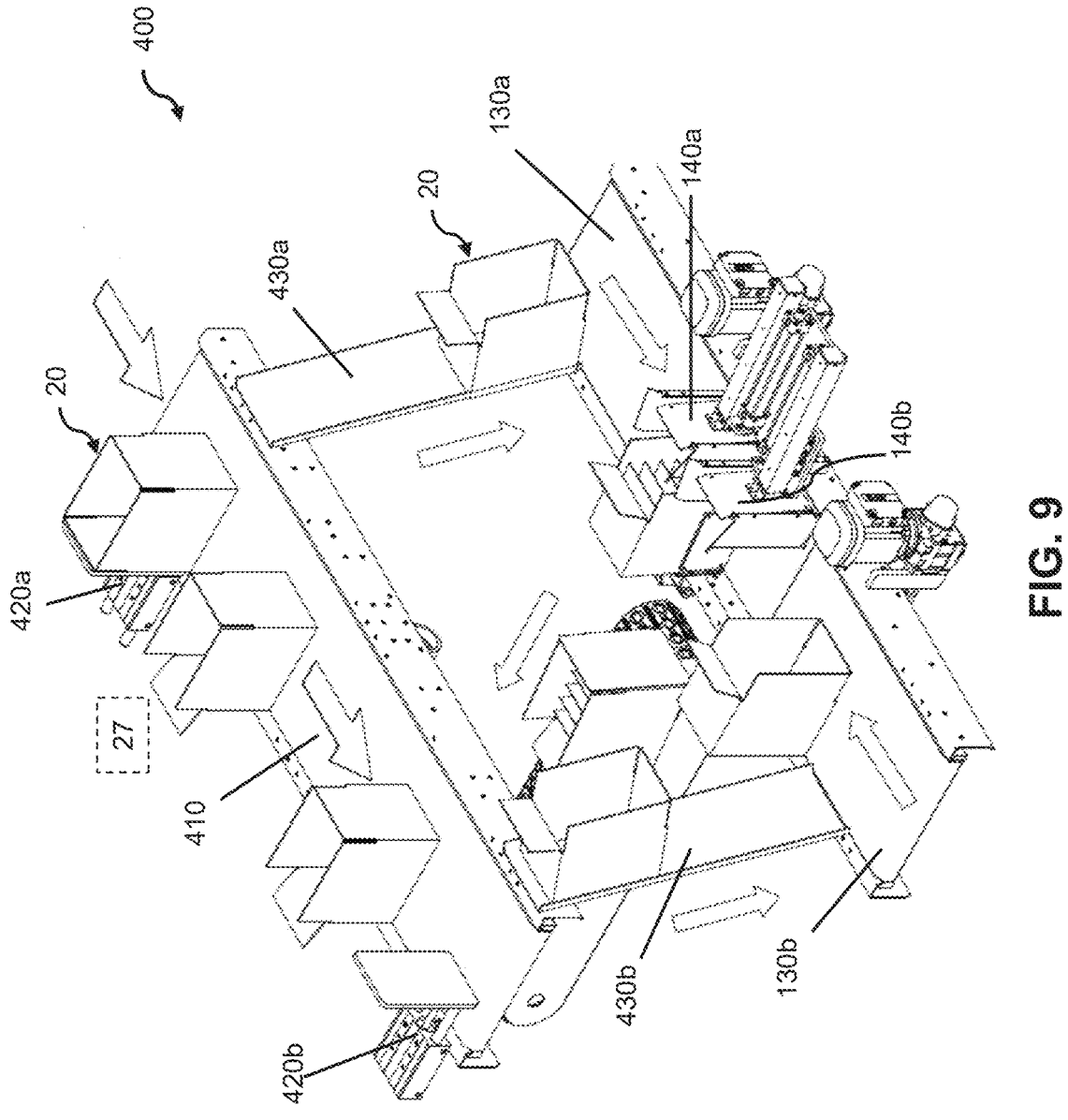
FIG. 9 is a perspective view of a case loader of the system of FIG. 6.

FIGS. 6-8 depict a robotic case packing system 400 according to the present disclosure. The robotic case packing system 400 may use many of the same components as the robotic case system 100, designated by like numerals. The case packing system 400 includes an article conveyor 100, and a case conveyor formed of two or more conveyor segments 130a and 130b, a controller 102 (shown schematically), and at least one multi-axis robot 120 in the form of a pick and place robot. The case packing system 400 may also include one or more transfer conveyors 160 and one or more loaded case conveyor 170s. The case packing system 400 may also include two or more product pushers 140a and 140b. The first product pusher 140a may be disposed along the first conveyor segment 130a, and the second product pusher 140b may be disposed along the second conveyor segment 130b. The case packing system 400 may also include a case loader 410, as depicted in FIG. 9. The controller 102 may be operatively coupled to the two or more conveyor segments 130a and 130b, the two or more transfer conveyors 160a and 160b, the two or more product pushers 140a and 140b, and the case loader 410.

The case packing system 400 includes two or more stacking and loading stations, generally adjacent to the first product pusher 140a (also referred to as the first loading station) and second product pusher 140b (also referred to as the second loading station). The case packing system 400 uses the robot 120 to pick and place a single article 10 at a time from the article conveyor 110 with a handler 128, and stack the picked article(s) 10 immediately adjacent to, and preferably at least partially within, a first container 20 oriented on its side on case conveyor segment 130a. The case packing system 400 may stack multiple articles 10 in a vertical arrangement, as designated by 26a in FIG. 8.

Upon completing a stack of articles 10 for the first container at the first loading station, the controller 102 may extend the first product pusher 140a from the loading position to a loaded position to move the stack of articles 10 to be fully within the container 20 at the first loading station. While the first container 20 at the first loading station is being loaded and rotated, the case packing system 400 uses the robot 120 to stack picked article(s) 10 immediately adjacent to, and preferably at least partially within, a second container 20 oriented on its side on case conveyor segment 130b at the second loading station. As with the first container 120 at the first loading station, upon completing a stack of articles 10, the controller 102 may extend the second product pusher 140b from the loading position to a loaded position to move the stack of articles 10 to be fully within the container 20 at the second loading station. While the container 20 at the second loading station is being loaded and rotated, the case packing system 400 may again use the robot 120 to stack picked article(s) 10 at another container located at the first loading station. The case packing system 400 may repeat this stacking and loading sequence, stacking at the first loading station while loading at the second loading station, and vice versa, loading at the first loading station while stacking at the second loading station.

By stacking and loading simultaneously, the case packing system 400 may increase the number of articles 10 that it can stack and load into containers during a given time period by minimizing stacking downtime. This sequence may also permit the article conveyor 110 to continuously convey articles without having to slow down or pause to permit sufficient time for case packing system to load the container using the product pusher and move a new, empty container into place for loading.

As depicted in FIG. 6, the case conveyor 130 may be formed of two or more case conveyor segments 130a and 130b that convey in parallel, but opposing directions. Alternatively, the case conveyor segments 130a and 130b may convey in parallel and the same direction. As depicted in FIG. 6, the end of the first conveyor segment 130a may generally be next to or near the end of the second conveyor segment 130b, such that the first and second loading station are adjacent to each other. While the first conveyor segment 130a and second conveyor segment 130b are depicted on the same side of the article conveyor 110 in FIG. 6, alternatively, the first conveyor segment 130a and second conveyor segment 130b may be on different sides of the article conveyor 110.

As depicted in FIG. 6, the case conveyor may include two or more case stops 28a and 28b. A first case stop 28a may be disposed along the first case conveyor segment 130a, for example, adjacent to or at the end of the case conveyor segment 130a, and a second case stop 28b may be disposed along the second case conveyor segment 130b, for example, adjacent to or at the end of the case conveyor segment 130b. The case stops 28a and 28b may define the first and second loading stations. As depicted in FIG. 8, the two or more case stops 28a and 28b may be formed of a plurality of walls, including a bottom wall 31, a side wall 32, and a back wall 33. The side wall 32 may serve to stop the container 20 along the conveyance direction of the case conveyor 130a or 130b and align the container 20 such that it is disposed in front of the product pusher 140a or 140b, and can receive a completed stack of articles 10. The back wall 33 may serve to prevent the container 20 from sliding backwards while the product pusher 140a or 140b extends from the loading position to the loaded position to move the stack of articles to be fully within the container 20. The bottom wall 31 may serve to hold the container 20 for loading articles 10. After the stack of articles 10 have been loaded into the container 20, the case stop 28a or 28b may pivot around its rotation axis to rotate the container 20 from a side orientation to an upright orientation, designated by the transition from 26b to 26c in FIG. 8. As the container 20 is being rotated, the back wall 33 of the case stop 28a or 28b begins to support the weight of the filled container 20. Upon the case stop 28a or 28b fully pivoting, the container 20 may then be received by the transfer conveyor 160.

The transfer conveyor 160 may be a single conveyor, or may be formed of two or more segments. For example, as depicted in FIG. 6, the transfer conveyor 160 may be formed of a first segment disposed behind the first case stop 28a to receive the loaded containers from the first loading station and a second segment disposed behind the second case stop 28b to receive the loaded containers from the second loading station. The controller 102 may operate the conveyance speed of the first segment independently of the conveyance speed of the second segment, or may operate them in the same manner.

While the case packing system 400 in FIGS. 6-8 is depicted with two loading stations loaded by a single robot 120, the case packing system 400 may include additional loading stations and additional product pushers. For example, the first case conveyor segment 130*a* could include two loading stations, and the second case conveyor segment 130*b* could two loading stations providing four loading stations. The case packing system 400 may include any number of loading stations for picking and placing of articles 10 and loading of containers 20.

While the case packing system 400 is depicted in FIGS. 6-8 with a single robot 120 picking and placing multiple loading stations, the case packing system 400 may alternatively include multiple loading stations, each served by one or more robots. For example, two or more robots 120 may be positioned and aligned along the article conveyor 110, each serving multiple loading stations, such as that depicted in FIGS. 6-8. This may increase the quantity of articles 10 that may be handled off the article conveyor 110.

As depicted in FIG. 9, the case packing system 400 may include a case loader 410. The case loader 410 moves the containers 20 along a conveyance direction and may be used to load the formed containers 20 onto the case conveyor 130*a* and 130*b*. The case loader 410 may also include a case erector (not shown) for constructing the containers 20, for example, constructing corrugated cardboard cases or similar containers. The case loader 410 may include one or more case pushers 420*a* and 420*b*, and one or more transfer slides 430*a* and 430*b* for moving the formed containers 20 from the case loader 410 to the case conveyor 130*a* and 130*b*. The case loader 410, one or more case pushers 420*a* and 420*b*, and one or more transfer slides 430*a* and 430*b* may be operatively connected to the controller 102. In some examples, the case loader 410 includes a flap positioner 27 (shown schematically) to retract the top foldable flap of the container 20.

The one or more case pushers 420*a* and 420*b* may include an actuator that extends from a retracted position to an extended position. As a container 20 is conveyed along the case loader 410, the case pusher 420*a* may be actuated from the retracted position to the extended position, pushing the container 20 from the case loader 410 to the transfer slide 430*a*, to then be transferred to the case conveyor 130. As depicted in FIG. 9, while the container 20 may travel along the case loader 410 in an upright orientation, when the container 20 travels down the transfer slide 430*a*, the container 20 may approach and be received by the case conveyor 130*a* in a side orientation, such that it is ready to receive a stack of articles from the product pusher 140*a* at the first loading station. In some examples, the container 20 may travel along the case loader 410 in a side orientation and be transferred to, and received by, the case conveyor 130*a* in the side orientation. In other examples, the container 20 may travel along the case loader 410 in an upright orientation and be transferred to, and received by, the case conveyor 130*a* in an upright orientation. In such examples, the case conveyor 130*a* may include a container rotator to rotate the container 20 from the upright orientation to the side orientation for loading.

As described, the case loader 410 may include more than one case pusher 410 to load the case conveyor at multiple locations. For example, the first case pusher 420*a* may push the first, third, and fifth container 20 to the first case conveyor 130*a* while the second case pusher 420*b* pushes the second, fourth, and sixth container 20 to the second case conveyor 130*b*. While the case packing system 400 is depicted in FIG. 9 as including one case loader 410, the case packing system 400 may include one or more case loaders 410 serving one or more loading stations, and one or more robots.

Many other modifications of the embodiments above may be made to adapt a particular situation or material to the teachings without departing from the scope of the current disclosure. Therefore, it is intended that the present devices and systems not be limited to the particular embodiments disclosed, but that the disclosed devices and systems include all embodiments falling within the scope of the appended claims. Moreover, the advantages described herein are not necessarily the only advantages of the present disclosure and it is not necessarily expected that every embodiment of the present disclosure will achieve all of the advantages described.

The foregoing description of preferred and other embodiments is not intended to limit or restrict the scope or applicability of this disclosure. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter.

It is intended that the appended claims include all modifications and alterations to the full extent that they come within the scope of the following claims or the equivalents thereof.

The invention claimed is:

1. A case packing system comprising:
an article conveyor for conveying an article;
a case conveyor for conveying a container, the container comprising a base and a plurality of sides defining a container cavity, the container further comprising two opposing foldable flaps extending from two of the plurality of sides;
a multi-axis robot disposed above the case conveyor;
a product pusher disposed along the case conveyor, wherein the product pusher comprises a vertical pushing wall movable from a loading position to a loaded position, and wherein a maximum vertical dimension of the vertical pushing wall is less than a vertical dimension of the container cavity;
two opposing side stabilizer walls adjacent the vertical pushing wall; and
a controller operatively coupled to the multi-axis robot, the controller configured to:
control the multi-axis robot to pick the article from the article conveyor and place the article such that at it is at least partially disposed between the two opposing foldable flaps of the container;
adjust a relative position of the article and the container from a first position where the article is at least partially disposed between the two opposing foldable flaps to a second position where the article is positioned fully within the container cavity; and
extend the vertical pushing wall from the loading position to the loaded position to adjust the relative position of the article and the container from the first position to the second position.

2. The system of claim 1, wherein the controller is configured to control the multi-axis robot to pick and place a plurality of articles such that the plurality of articles are all at least partially disposed between the two opposing foldable flaps and are oriented in a stacked, vertical arrangement.

3. The system of claim 1, wherein the controller is further configured to retract the product pusher from the loaded position to the loading position.

4. The system of claim 1, wherein the system is configured to arrange the article in a generally straight line with a plurality of articles along a direction of travel of the article conveyor.

5. The system of claim 1, wherein the product pusher is further movable to a tipping position, wherein the tipping position is in a direction perpendicular to the direction between the loading position and the loaded position.

6. The system of claim 1, wherein the case conveyor further comprises a case stop providing a pivot axis, and wherein the controller is further configured to:

rotate the container about the pivot axis from a side orientation to an upright orientation, wherein in the side orientation, an opening of the container cavity faces toward the product pusher and in the upright orientation, the opening of the container cavity faces perpendicular to the product pusher.

7. The system of claim 1, wherein the controller is further operatively coupled to a container rotator, wherein the controller is further configured to:

control the container rotator to rotate the container from an upright orientation to a side orientation, wherein in the upright orientation, the container cavity faces perpendicular to the product pusher and in the side orientation, the container cavity faces toward the product pusher.

8. The system of claim 1, wherein the controller is further operatively coupled to a flap positioner, wherein the controller is further configured to:

control the flap positioner to fold a top foldable flap of the container outward from the container cavity of the container to provide clearance for the multi-axis robot in a vertical direction.

9. The system of claim 8, wherein the flap positioner includes a vacuum grabber head for vacuuming and folding the top foldable flap outward from the container cavity.

10. The system of claim 1, wherein the product pusher further comprises the two opposing the side stabilizer walls, wherein the side stabilizer walls are joined to the vertical pushing wall to together form a general U-shape, and wherein a maximum horizontal dimension of the two opposing side stabilizer walls is less than a horizontal dimension of the container cavity when the container is in a side orientation.

11. The system of claim 1, wherein the case conveyor comprises a first conveyor segment and a second conveyor segment, and wherein the system further comprises:

a first product pusher disposed along the first conveyor segment;

a second product pusher disposed along the second conveyor segment.

12. The system of claim 1, wherein the case conveyor comprises a first conveyor segment and a second conveyor segment, and wherein the system further comprises a case loader for conveying the container to the first conveyor segment or the second conveyor segment.

13. The system of claim 1, wherein the multi-axis robot comprises a vacuum pick handler for picking and placing the article.

14. The system of claim 1, wherein each of the two opposing side stabilizer walls are angled inward such that a width dimension between the side stabilizer walls at an end near the vertical pushing wall is greater than a width dimension between the side stabilizer walls at an end near the container.

15. A case packing system comprising:

an article conveyor for conveying a plurality of articles;

a case conveyor for conveying a container, the container comprising a base and a plurality of sides defining a container cavity, the container further comprising two opposing foldable flaps extending from two of the plurality of sides defining an opening to the container cavity;

a multi-axis robot disposed above the case conveyor;

a vertical pushing wall disposed along the case conveyor, wherein a maximum vertical dimension of the vertical pushing wall is less than a vertical dimension of the container cavity;

two opposing side stabilizer walls adjacent the vertical pushing wall; and a controller operatively coupled to the multi-axis robot, the controller configured to:

control the multi-axis robot to pick and place the plurality of articles in a stacked, vertical arrangement aligned with the opening to the container cavity; and adjust a relative position of the plurality of articles and the container such that the plurality of articles are positioned fully within the container cavity.

* * * * *